United States Patent [19]

Teramachi

[11] Patent Number: 4,774,447
[45] Date of Patent: Sep. 27, 1988

[54] LINEAR MOTOR-DRIVEN TABLE APPARATUS CAPABLE OF OPERATING BOTH IN FINE-FEED AND LARGE-FEED MODES

[76] Inventor: Hiroshi Teramachi, 2-34-8 Higashi-Tamagawa,, Setagaya-ku, Tokyo, Japan

[21] Appl. No.: 63,711

[22] Filed: Jun. 15, 1987

Related U.S. Application Data

[63] Continuation of Ser. No. 790,094, Oct. 22, 1985, abandoned.

[30] Foreign Application Priority Data

Oct. 23, 1984 [JP] Japan .................................. 59-221295

[51] Int. Cl.$^4$ ............................................ H02K 41/02
[52] U.S. Cl. ...................................... 318/135; 310/13
[58] Field of Search ............... 310/12, 13, 14; 318/37, 318/38, 135

[56] References Cited

U.S. PATENT DOCUMENTS 3,268,747  8/1966  Snowdon .............................. 310/13
3,716,731  2/1973  Nilsson .................................. 310/13
4,315,171  2/1982  Schaeffer .......................... 310/12 X Primary Examiner—Mark O. Budd
Assistant Examiner—Judson H. Jones
Attorney, Agent, or Firm—Thomas M. Freiburger

[57] ABSTRACT

A linear motor-driven table apparatus is capable of operating both in fine-feed mode and large-feed mode. The table apparatus comprises a base, an intermediate carriage and a table body, the intermediate carriage and the table body being carried by the base through linear bearings such that the intermediate carriage and the table body are movable in the longitudinal direction of the base with respect to the base and with respect to each other. The movement of the intermediate carriage with respect to the base is effected by a first linear motor acting therebetween, while the movement of the table body with respect to the intermediate carriage is caused by a second linear motor acting therebetween. The amount of feed of the table body with respect to the base is controlled by controlling the supply of pulses to the first and second linear motors.

11 Claims, 11 Drawing Sheets

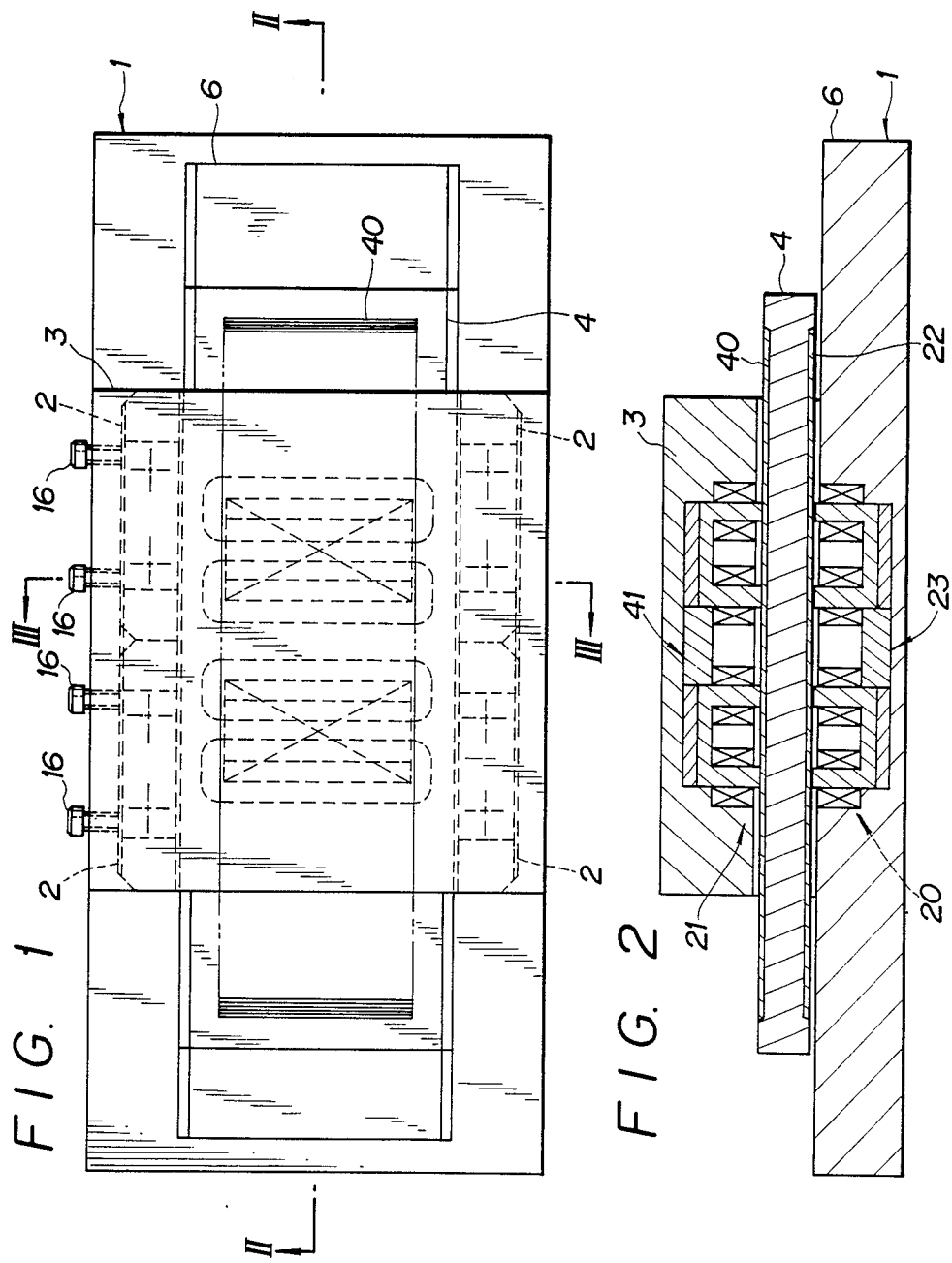

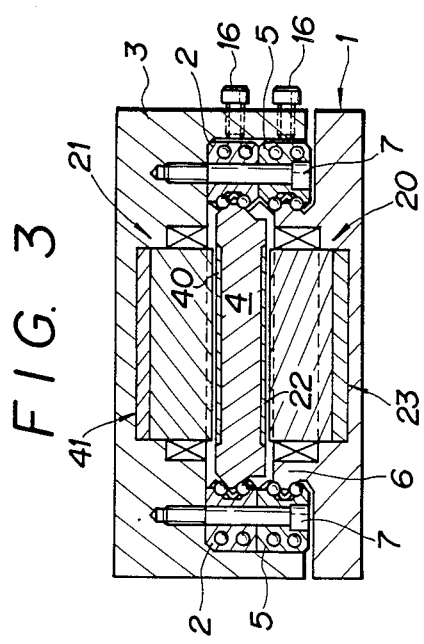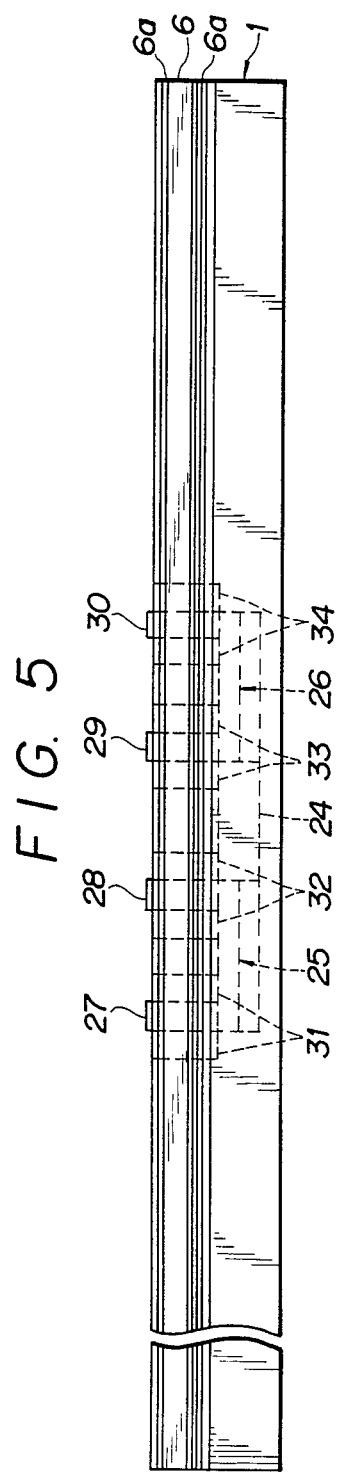

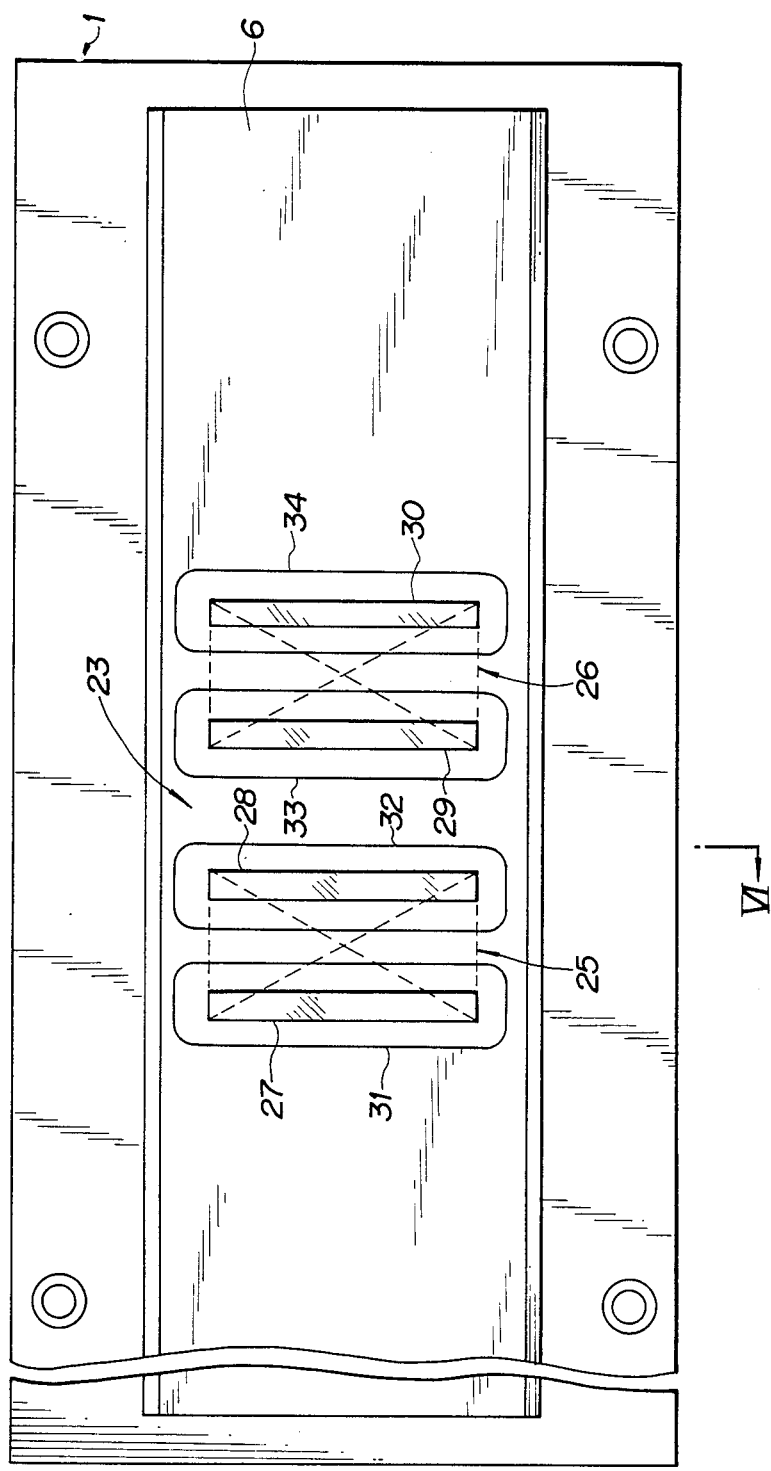

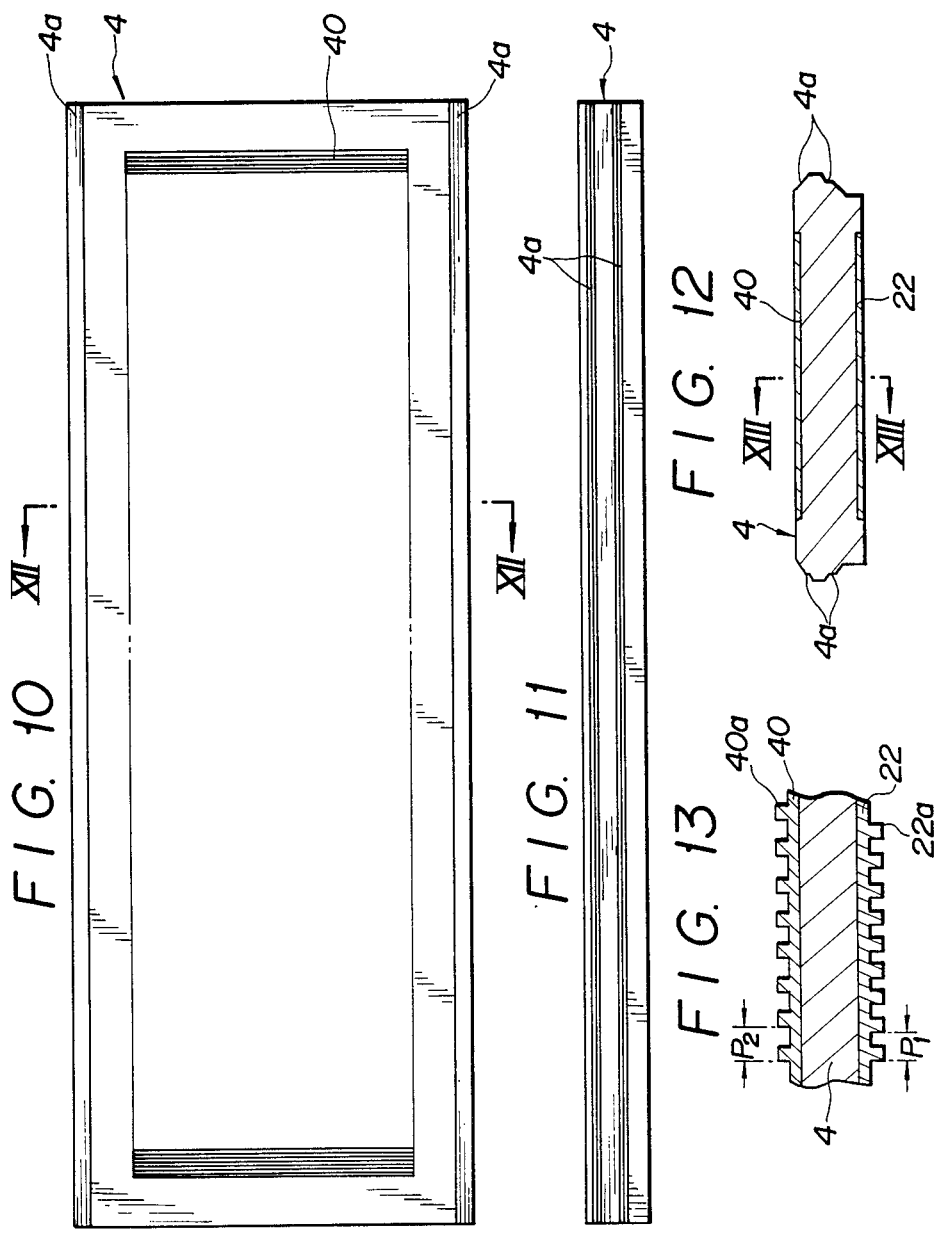

LINEAR MOTOR-DRIVEN TABLE APPARATUS CAPABLE OF OPERATING BOTH IN FINE-FEED AND LARGE-FEED MODES

This is a continuation of co-pending application Ser. No. 790,094 filed on 10-22-85 now abandoned.

BACKGROUND OF THE INVENTION

The present invention relates to a table apparatus employing linear motors as driving means and capable of operating both in fine-feed mode and large-feed mode.

The present inventor has already proposed a table apparatus having the following features, in the specification of Japanese Patent Application No. 198803/1983 which was filed in advance of the present application but not laid-open yet. Briefly, this table apparatus has a movable table movably supported through linear bearings on a track member which in turn is mounted on a stationary bed. The stationary bed carries, rotatably but not axially movably, a ball screw shaft which in turn carries, through steel balls, a ball nut for free movement both in the rotational and axial directions. The ball nut is suitably connected to the movable table. On the other hand, a ball spline shaft is rotatably mounted on the stationary bed, in the vicinity of the ball screw shaft, and an outer sleeve is splined, through the intermediary of steel balls, to the ball spline shaft for rotation therewith and for axial movement thereon. The outer sleeve is operatively connected to the ball nut through a suitable connecting mechanism. The ball screw shaft and the ball spline shaft are driven by respective rotary motors, so that the speed of feed of the movable table is varied from fine feed speed to large feed speed in a stepped manner by a suitable selection of the rotary motors.

This table apparatus employing the ball screw and nut assembly and the ball spline assembly, however, suffers from a problem in that the response of movement of the movable table is impaired to make it difficult to precisely control the position of the movable table, due to undesirable twisting of the screw shaft and the spline shaft by the driving torque and also due to the presence of small backlash or play inevitably existing between the screw shaft and the nut and between the spline shaft and the outer sleeve.

In addition, the moving table carrying heavy parts such as the ball screw and nut assembly and the ball spline assembly exhibits a large inertia which undesirably impairs the starting and stopping response characteristics.

It is to be pointed out also that the size of the table apparatus as a whole is increased because of the necessity of the spaces for mounting the rotary motors, ball screw and nut assembly and the ball spline assembly.

SUMMARY OF THE INVENTION

Accordingly, a primary object of the invention is to provide a compact linear motor-driven table apparatus capable of making fine feed, as well as large feed, wherein the weight of movable parts is reduced by elimination of the ball screw and nut asembly and the spline assembly, thereby improving the starting and stopping response characteristics, and thus attaining a remarkable improvement in the precision in the position control of the movable table.

To this end, according to the present invention, there is provided a linear motor-driven table apparatus capable of operating both in fine-feed mode and large-feed mode, the apparatus comprising a base, an intermediate carriage and a table body, the intermediate carriage and the table body being carried on the base through linear bearings such that the intermediate carriage and the table body are movable in the longitudinal direction of the base with respect to the base and with respect to each other, the apparatus further comprising a first linear motor acting between the base and the intermediate carriage, and a second linear motor acting between the intermediate carriage and the table body.

DESCRIPTION OF THE DRAWINGS

FIG. 1 is a plan view of the whole part of a first embodiment of a linear motor-driven table apparatus in accordance with the invention;

FIG. 2 is a sectional view taken along the line II—II of FIG. 1;

FIG. 3 is a sectional view taken along the line III—III of FIG. 1;

FIG. 4 is a plan view of a base incorporated in the first embodiment;

FIG. 5 is a side elevational view of the base;

FIG. 10 is a plan view of an intermediate carriage incorporated in the first embodiment;

FIG. 11 is a side elevational view of the intermediate carriage;

FIG. 12 is a sectional view taken along the line XII—XII of FIG. 10;

FIG. 13 is a sectional view taken along the line XIII—XIII of FIG. 12;

DESCRIPTION OF THE PREFERRED EMBODIMENTS

Figures 6, 7:
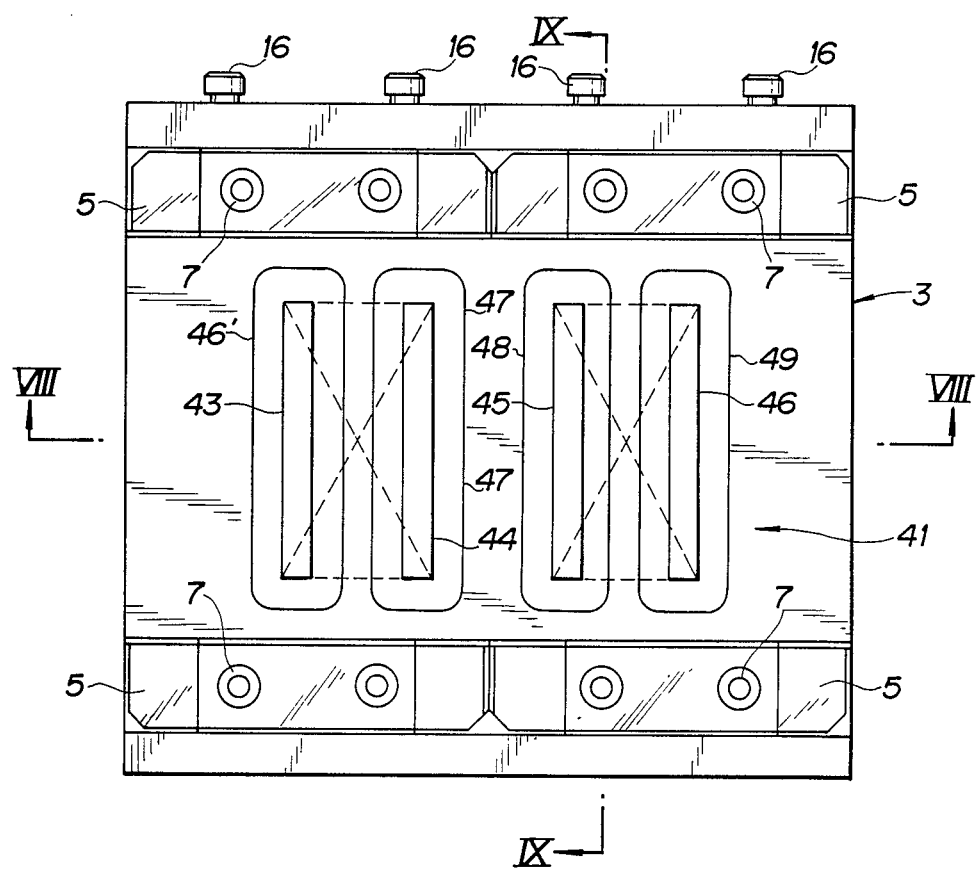
FIG. 6 is a sectional view taken along the line VI—VI of FIG. 6.
FIG. 7 is a bottom plan view of a table body incorporated in the first embodiment.

FIGS. 1 to 18 show a first embodiment of the invention. Referring first to FIGS. 1 to 3 showing the whole arrangement of the first embodiment, a base 1 is adapted to be fixed to a suitable stationary foundation such as a bed which is not shown. A table body 3 is carried by the base 1 for linear sliding movement in the longitudinal direction thereof, through intermediary of a left pair of linear bearings 5 and a right pair of linear bearings 5.

An intermediate carriage 4, which is disposed between the table body 3 and the base 1, is mounted on the table body 3 through the intermediary of the left pair of linear bearings 2 and the right pair of linear bearings 2 such as to be able to slide linearly in the longitudinal direction thereof.

Figure 8:
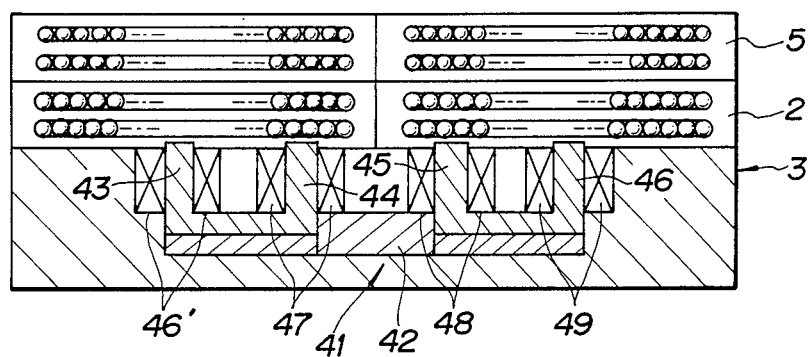
FIG. 8 is a sectional view taken along the line VIII—VIII of FIG. 7.
Figure 9:
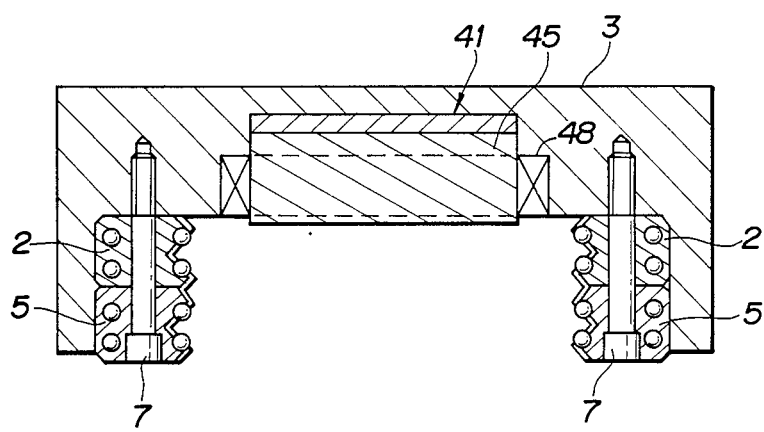
FIG. 9 is a sectional view taken along the line IX—IX of FIG. 7.

As will be seen from FIGS. 4 to 6, a track 6 is formed integrally with the base 1 such as to protrude upright therefrom and to extend in the longitudinal direction of the base 1. As shown in FIG. 5, loaded-ball rolling grooves 6a are formed in each side surface of the track 6. On the other hand, the intermediate carriage 4 is composed of a flat tabular member with a couple of loaded-ball rolling grooves 4a formed in each side surface thereof, as will be seen from FIGS. 10 to 12. Referring now to FIGS. 7 to 9, the table body 3 has a substantially inverted U-shaped cross-section. Each of the linear bearings 2 and 5 superposed on each other is secured to the inner surface of the table body 3 at each breadthwise end of the latter, through a suitable means 7 such as bolts.

Figure 14:
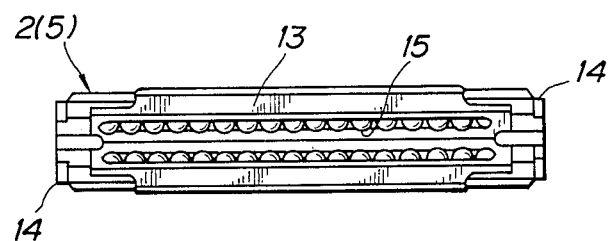
FIG. 14 is a front elevational view of a linear bearing incorporated in the first embodiment.
Figure 15:
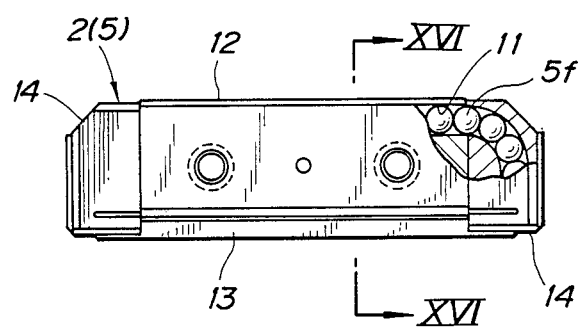
FIG. 15 is a partly-sectioned plan view of the linear bearing.
Figure 16:
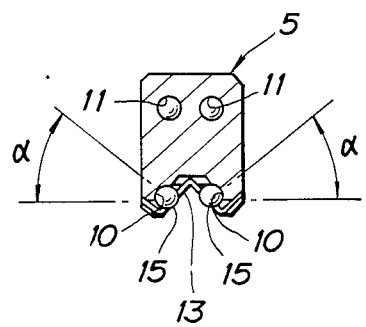
FIG. 16 is a sectional view taken along the line XVI—XVI of FIG. 15.

As shown in FIGS. 14 to 16, each of the linear bearings 2,5 comprises a bearing block 12 provided with two ball-rolling grooves 10 on one end thereof and also with two internal ball-recirculating holes 11; a retainer 13 which retains two loaded ball trains; and a pair of end plates 14 each of which provides communication between the ball-rolling grooves 10 and the corresponding ball-recirculating holes 11 so as to allow the balls 15 to roll and recirculate along endless passages formed by the ball-rolling grooves 10 and the ball-recirculating holes 11. In the illustrated embodiment, the angle $\alpha$ of contact between the ball-rolling grooves 10 and the loaded balls 15 is about 45°. This angle, however, is not exclusive and can be selected freely within the range of between 30° and 60°.

As shown in FIG. 3, the linear bearings 2 are provided between the intermediate carriage 4 and the table body 3, while the linear bearings 5 are provided between the table body 3 and the track 6. The clearances between the linear bearings 2 and the opposing surfaces of the intermediate carriage 4, as well as the clearances between the linear bearings 5 and the opposing surfaces of the track 6, are adjustable by means of clearance-adjusting bolts 16. Namely, as the clearance-adjusting bolts 16 are tightened, the inner ends of these bolts press the adjacent bearings 2 and 5 towards the adjacent surfaces of the intermediate carriage 4 and the track 6, respectively, while the reactional force acting on these bolts is transmitted through the table body 3 such as to press the other linear bearings 2 and 5 towards the other surfaces of the intermediate carriage 4 and the track 6, thus suitably preloading the loaded balls 15.

A first linear motor, generally designated at numeral 20, is provided between the base 1 and the intermediate carriage 4, while a second linear motor, generally designated at numeral 21, is provided between the intermediate carriage 4 and the table body 3. In the illustrated embodiments, each of the linear motors 20, 21 is a linear pulse motor which is constituted by a fixed member 22 and a movable member 23, and adapted to operate in response to pulses inputted to the movable member 23 from a pulse generating means which is not shown.

The construction of the first linear motor 20 will be explained with specific reference to FIGS. 17A and 17B. The fixed member 22 is made of a magnetic material and has a flat tabular form. The fixed member 22 is secured to the underside of the intermediate carriage 4 such as to extend in the longitudinal direction thereof. On the other hand, the movable member 23 is secured to the upper side of the base 1 such as to oppose the fixed member 22. The movable member 23 has a central permanent magnet 24 and left and right magnetic cores 25 and 26 arranged to face each other across the central permanent magnet 24. The left magnetic core 25 has first and second magnetic poles which are magnetized in N polarity by the central permanent magnet 24. On the other hand, third and fourth magnetic poles 29 and 30 on the right magnetic core 26 are magnetized in S polarity.

Figure 17A:
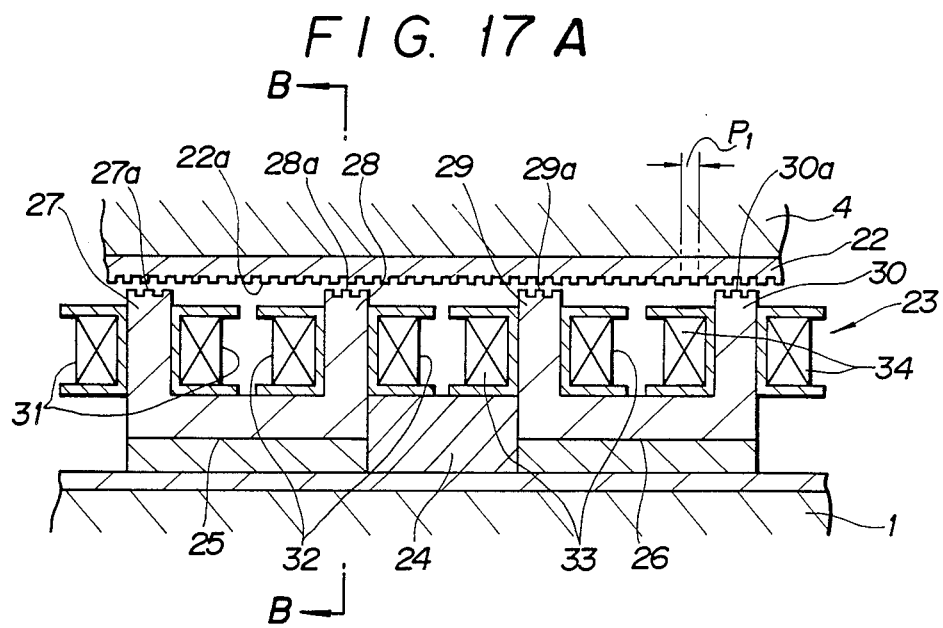
FIG. 17A is an enlarged sectional side elevational view of a first linear motor incorporated in the first embodiment.
Figure 17B:
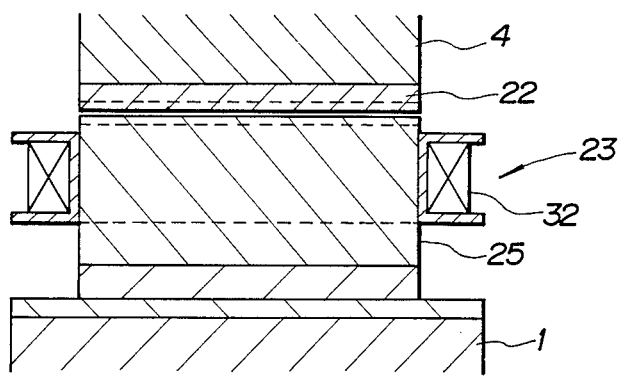
FIG. 17B is a sectional view taken along the line B—B of FIG. 17A.
Figure 18A:
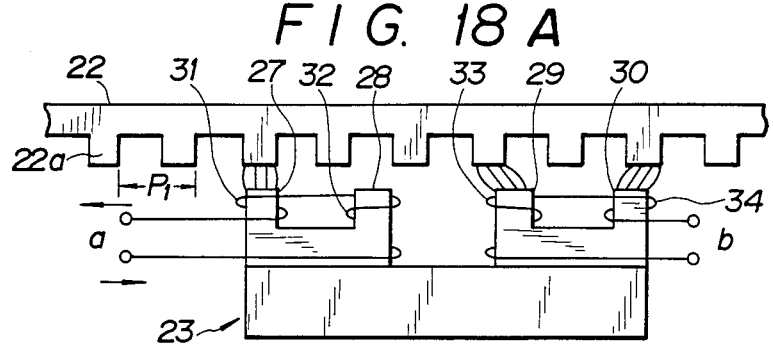
FIGS. 18A to 18D are schematic side elevational views of the first linear motor, showing different steps of operation thereof.
Figure 18B:
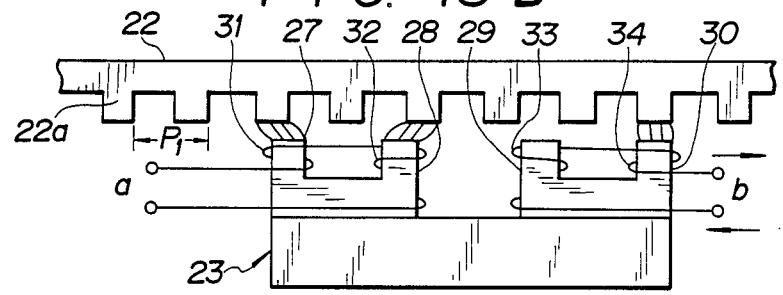
Figure 18C:
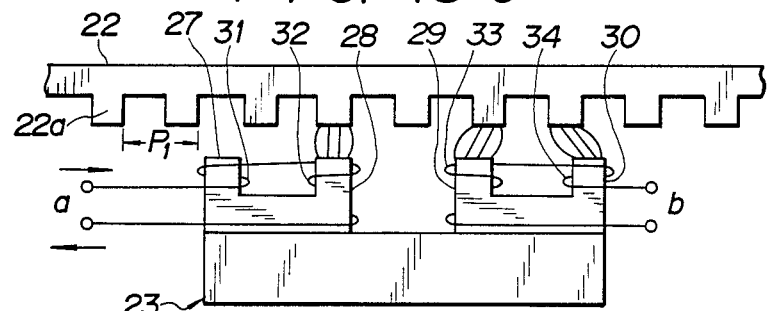
Figure 18D:
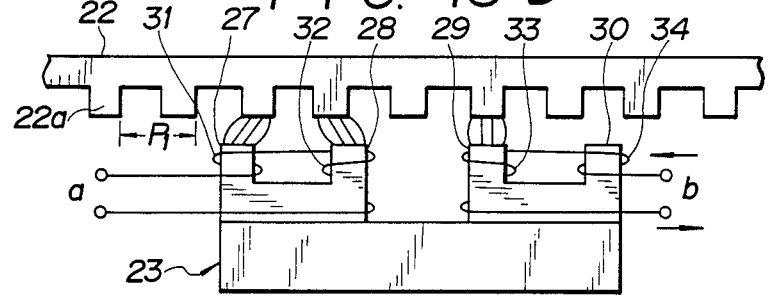

As shown in FIG. 17A, a multiplicity of fixed teeth 22a, each having a rectangular cross-section and extending in the direction substantially perpendicular to the longitudinal direction of the fixed xember 22, are formed on the underside of the fixed member over the entire length of the fixed member 22 at a constant pitch $P_1$. The first to fourth magnetic poles 27 to 30 are provided with pole teeth at the same pitch as the teeth on the fixed member 22.

The first and second magnetic poles 27 and 28 of N polarity carry, respectively, first and second coils 31 and 32 wound thereon. These coils 31 and 32 are connected in series such that they produce magnetic fluxes of counter-directions when electric pulse current is supplied to these coils from a pulse generating means (not shown) electrically connected to these coils 31, 32.

Similarly, the third and fourth magnetic poles 29 and 30 of S polarity carry, respectively, third and fourth coils 33 and 34 wound thereon. These coils 33 and 34 are connected in series such that they produce magnetic fluxes of counter-directions when electric pulse current is supplied to these coils from the pulse generating means (not shown) electrically connected to these coils 33, 34. For the purpose of simplification of explanation, it is assumed here that the phase of the pole teeth 28a of the second magnetic pole 28 is offset from the phase of the pole teeth 27a of the first magnetic pole 27 by an amount corresponding to ½ pitch, i.e., $P_1/2$, and the phase of the pole teeth 29a of the third magnetic pole 29 is offset from the phase of the pole teeth 30a of the fourth magnetic pole 30 by an amount corresponding to ½ pitch, i.e., $P_1/2$. It is assumed also that the pole teeth 29a, 30a of the third and fourth magnetic poles 29, 30 of S polarity are offset in phase from the pole teeth 27a, 28a of the first and second magnetic poles 27, 28 of N polarity by an amount corresponding to ¼ pitch, i.e., $P_1/4$.

The principle of operation of the linear pulse motor incorporated in this embodiment will be explained with specific reference to FIGS. 18A to 18D which schematically illustrate the operation of this linear pulse motor.

The arrangement is such that the first and second coils 31 and 32 receive pulses through terminals a, while the third and fourth coils 33 and 34 receive pulses through terminals b. In a state shown in FIG. 18A, the pulse current is supplied to the terminals a in such a direction as to excite the first magnetic pole 27. This state will be referred to as Mode (1), hereinunder. In another state shown in FIG. 18B, the pulse current is supplied to the terminals b in such a direction as to excite the fourth magnetic pole 30 (Mode (2)). In still another state shown in FIG. 18C, the pulse current is supplied to the terminals a in such a direction as to excite the second magnetic pole 28 (Mode (3)). Finally, in a state shown in FIG. 18D, the pulse current is supplied to the third magnetic pole 29 in such a direction as to excite the third magnetic pole 29 (Mode (4)).

The conditions of generation of magnetic force by each magnetic pole in Modes (1) to (4) are shown in Table 1 below.

TABLE 1

| Mode | Magnetic force generating conditions | | Stable position |
|---|---|---|---|
| (1) | First pole: | flux from magnet 24 + flux from coil 31 | First pole |
|  | Second pole: | flux from magnet 24 − flux from coil 32 = 0 |  |
|  | Third and fourth poles: | magnetic forces by magnet 24 balanced |  |
| (2) | First and second poles: | magnetic forces by magnet 24 balanced | Fourth pole |
|  | Third pole: | flux from magnet 24 − flux from coil 33 = 0 |  |
|  | Fourth pole: | flux from magnet 24 + flux from coil 34 |  |
| (3) | First pole | flux from magnet 24 − flux from coil 31 = 0 | Second pole |
|  | Second pole: | flux from magnet 24 + flux from coil 32 |  |
|  | Third and fourth poles: | magnetic forces by magnet 24 balanced |  |
| (4) | First and second poles: | magnetic forces by magnet 24 balanced | Third pole |
|  | Third pole: | flux from magnet 24 + flux from coil 33 |  |
|  | Fourth pole: | flux from magnet 24 − flux from coil 34 |  |

As will be seen from Table 1, in Mode (1), the first magnetic pole 27 of N polarity exerts the strongest magnetic force, so that the movable member 23 is held in a stable state by the magnetic attraction force acting between the first magnetic pole 27 and the corresponding tooth of the fixed member 9. On the other hand, the third and fourth magnetic poles 29 and 30 of S polarity are offset by ¼ pitch from adjacent teeth 22a on the fixed member 22.

In Mode (2), the magnetic pole 27 does not produce force any more and, instead, the fourth magnetic pole 30 of S polarity produces the strongest force, so that the movable member 23 is relatively moved by a distance corresponding to ¼ pitch, i.e., $P_1/4$, such that the fourth magnetic pole 30 comes into phase with the adjacent tooth 22a on the fixed member 22. Meanwhile, the first and second magnetic poles 27, 28 of N polarity are offset from the adjacent tooth 22a on the fixed member 22 by a distance corresponding to ¼ pitch, i.e., $P_1/4$.

In mode (3), the second magnetic pole 28 of N polarity produces the strongest magnetic force, so that the movable member 23 is relatively moved by a distance corresponding to ¼ pitch, i.e., $P_1/4$, such that the second magnetic pole 28 comes into phase with the adjacent tooth 22a on the fixed member 22. On the other hand, the third and fourth magnetic poles 29, 30 of S polarity are offset from the adjacent teeth 22a on the fixed member by a distance corresponding to ¼ pitch, i.e., $P_1/4$.

In Mode (4), the third magnetic pole 29 of S polarity exerts the strongest force so that the movable member 23 is relatively moved by a distance corresponding to ¼ pitch, i.e., $P_1/4$, such that the magnetic pole 29 comes into phase with the adjacent tooth 22a on the fixed member 22.

Thereafter, the operation proceeds in Mode (1) again so that the first magnetic pole 27 of N polarity comes to produce the strongest force. As a result, the movable member 23 is further moved by a distance correponding to ¼ pitch, i.e., $P_1/4$, thus resuming the state shown in FIG. 18a. In this way, the movable member 23 travels a distance corresponding to ¼ pitch by sequential repetition of Modes (1) to (4).

The second linear motor 21, disposed between the intermediate carriage 4 and the table body 3, has a construction similar to that of the first linear motor explained hereinabove. Namely, as shown in FIGS. 1 to 3 and FIGS. 7 to 12, the second linear motor 21 has a flat tabular fixed member 40 secured to the upper side of the intermediate carriage 4 such as to extend in the longitudinal direction thereof, and a movable member 41 secured to the underside of the table body 3. As in the case of the movable member 21 of the first linear motor, the movable member 41 of the second linear motor has a permanent magnet 42, first and second magnetic poles 43 and 44 magnetized in N polarity by the permanent magnet 42 and third and fourth magnetic poles 45 and 46 magnetized in S polarity by the permanent magnet. First, second, third and fourth coils 46', 47, 48 and 49 are wound on respective magnetic poles 43 to 46. The first coil 46', second coil 47, third coil 48 and the fourth coil 49 are electrically connected to the pulse generating means (not shown). In operation, the table body 3 is moved relatively to the intermediate carriage 4 in the longitudinal direction of the base 1 in accordance with the pulses supplied from the pulse generating means.

As will be seen from FIG. 13, the fixed member 40 of the second linear motor secured to the upper side of the intermediate carriage 4 have teeth 40a formed at a constant pitch $P_2$ which is differet from the pitch $P_1$ of the teeth 22a of the fixed member 22 of the first linear motor. For the simplification of explanation, an assumption is made also in the case of the second linear motor that the phase of the teeth on the second magnetic pole 44 is offset by an amount corresponding to ½ pitch, i.e., $P_2/2$, from the phase of the teeth on the first magnetic pole 43, while the phase of the teeth on the fourth magnetic pole 46 is offset by an amount corresponding to ½ pitch, i.e., $P_2/2$, from the phase of the teeth on the third magnetic pole 45.

It is assumed also that phases of the teeth on the third and fourth magnetic poles 45 and 46 of S polarity are offset from the phases of the first and second magnetic poles of N polarity by an amount corresponding to ¼ pitch ($P_2/4$). Therefore, the movable member 41 can move a distance correponding to ¼ pitch, i.e., $P_2/4$, in response to each of successive pulses.

The operation of the first embodiment of the linear motor-driven table apparatus will be explained hereinunder.

In the large-feed mode of operation, the table body 3 is moved at a large rate with respect to the base 1. For effecting the large-feed of the table body 3, pulses are inputted to the moving member 23 of the first linear motor 20 adjacent the base 1 from the pulse generating means (not shown) so that the movable member 23 moves with respect to the fixed member 22 on the lower side of the intermediate carriage 4 at a rate of ¼ pitch, i.e., $P_1/4$, per one pulse, so that the table body 3 travels together with the intermediate carriage 4 in the longitudinal direction at a rate of ¼ pitch, i.e., $P_1/4$, per one pulse, in the longitudinal direction of the base 1. Meanwhile, pulses are supplied from the pulse generating means (not shown) to the movable member 41 of the second linear motor 21 adjacent to the table body 3, in the reverse polarity to the pulses supplied to the first linear motor. In consequence, the movable member 41 moves with respect to the fixed member 40 on the upper side of the intermediate carriage 4 in the same direction as that of the movement of the first linear motor 20 at a rate of ¼ pitch, i.e., $P_2/4$, per one pulse. Namely, the second linear motor 21 drives the table body 3 with respect to the intermediate carriage 4 in the same direction as the driving by the first linear motor 20. In consequence, the table body 3 runs a distance $(P_1/4+P_2/4)$ relatively to the base 1 per one pulse, thus attaining the large-feed.

In a fine-feed mode of operation, the table body 3 is fed finely. This can be achieved by supplying pulse currents of the same polarity to the movable members 23 and 41 of the first and second linear motors 20 and 21. In this case, while the first linear motor 10 drives the table body 3 together with the intermediate carriage 4 in the longitudinal direction of the base 1 at the rate of ¼ pitch, i.e., $P_1/4$ per one pulse, the second linear motor 21 drives the table body 3 with respect to the intermediate carriage 4 at the rate of ¼ pitch, i.e., $P_2/4$, per one pulse, in the direction counter to the direction of feed by the first linear motor 20. Consequently, the first and second linear motors in combiaation feed the table body 3 with respect to the base 1 at a rate of $(P_1/4-P_2/4)$ per one pulse, thus effecting the fine feed of the table body 3.

The speed of feed of the table body 3 can be increased and decreased by increasing and decreasing the frequency of the pulses. The distance of travel is adjustable by varying the number of pulses inputted to the linear motors.

It will be understood that, since the linear bearings 2 and 5 are suitably preloaded, any backlash or play between the table body 3 and the intermediate carriage 4 and between the intermediate carriage 4 and the base 1 is avoided even when a load is applied to the table body 3. In addition, since the angle of contact between the loaded ball 15 and the ball-rolling grove 10 is selected to be about 45°, it is possible to bear the load equally in all directions, i.e., vertical and lateral directions, so that a constant clearance is maintained between the movable member and the fixed member of the linear motor, thereby assuring a constant propulsion force, as well as a constant fixing force. Thus, the linear bearings 2 and 5 employing rolling steel balls suffer from minimal wear so that there is no risk of interference between the movable member and the fixed member even when the table body 3 is loaded. This in turn permits the clearance between the movable member and the fixed member to be minimized, thus affording a large propulsion force during movement and a large fixing force upon stoppage.

Although the linear pulse motors of the described embodiment are arranged such as to feed the movable member with respect to the fixed member at a rate of ¼ pitch of the teeth per one pulse, this value of the feeding rate is not exclusive and any feed rate can be adopted provided that a constant feed per one pulse is obtained. It is to be understood also that the use of the linear pulse motor is only illustrative and other types of linear motor such as a linear D.C. motor, linear synchronous motor and so forth can be used equally well.

Figure 19:
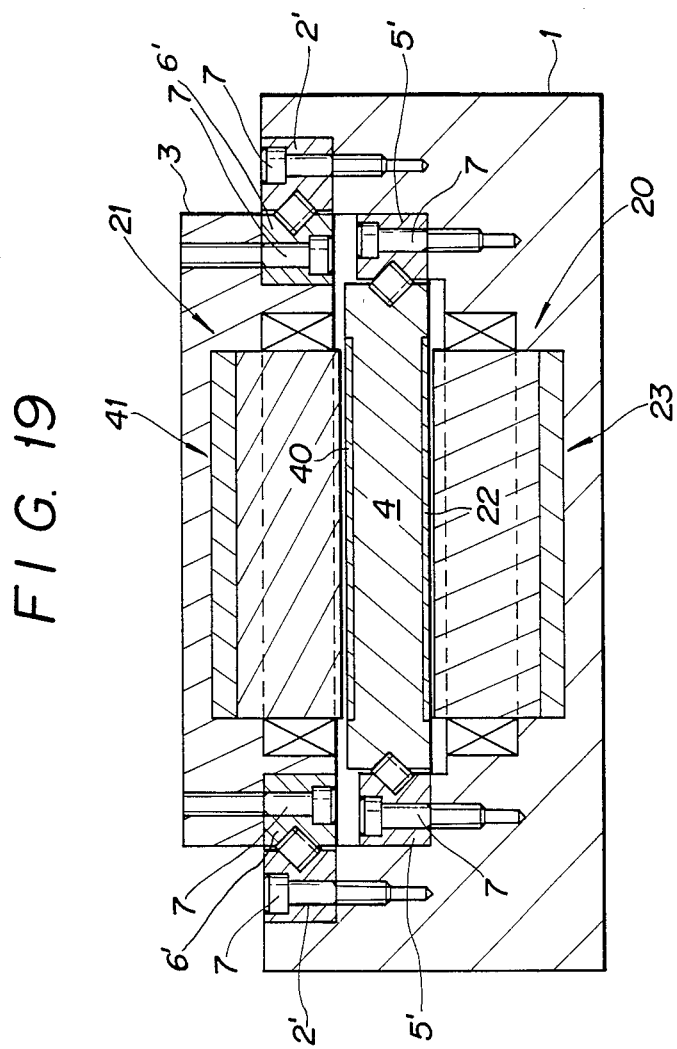
FIG. 19 is a sectional view similar to FIG. 3, showing a second embodiment of the table apparatus in accordance with the invention.

FIG. 19 shows a second embodiment of the linear motor-driven table apparatus in accordance with the invention. In this embodiment, the intermediate carriage 4 and the table body 3 are mounted on the base 1 for movement in the longitudinal direction of the base 1, through the intermediary of linear bearings 2' and 5' which are linear cross-roller bearings. Linear roller bearings 2' are provided between the base and the guide track 6' on the table body 3, while linear roller bearings 5' are provided between the base 1 and a guide track formed integrally with the intermediate carriage 4. Other portions of the construction, as well as the operation, are basically the same as those of the first embodiment, so that detailed description thereof is omitted.

Figure 20:
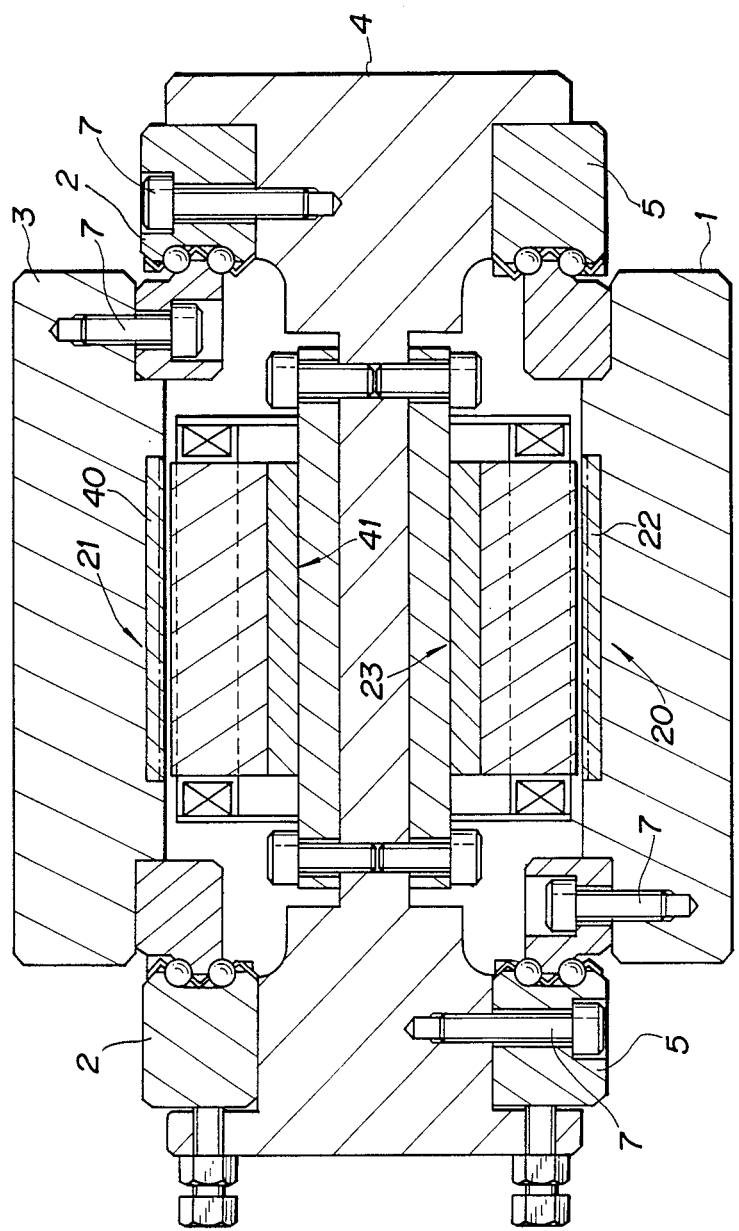
FIG. 20 is a sectional view similar to FIG. 3, showing a third embodiment of the invention.

FIG. 20 shows a third embodiment of the linear motor-driven table apparatus of the invention. In this embodiment, the intermediate carriage 4 has a substantially I-shaped cross-section and is supported at its both breadthwise ends on the base 1 through the intermediary of linear bearings 5 which are in this case linear ball bearings, such as to be able to move in the longitudinal direction of the base along the guide track 6 on the base. The intermediate carriage 4 in turn supports the table 3 for longitudinal movement through intermediary of linear bearings 2 which also are linear ball bearings. Linear bearings 2 move along guide track 6 on the table body. The movable members 23 and 41 of the first and second 1 motors 20 and 21 are disposed on the lower and upper sides of the intermediate carriage 4, respectively, while the fixed members 22 and 40 of these linear motors 20 and 21 are disposed on the upper side of the base 1 and on the lower side of the table body 3, respectively. Other portions of the construction, as well as the operation, of the third embodiment are materially identical to those of the first embodiment so that detailed description thereof is omitted.

In FIGS. 19 and 20 showing the second and third embodiments, the same reference numerals are used to denote the same parts or members as those of the first embodiment.

The arrangements of the fixed and movable members 22, 40 and 23, 41 of the first and second linear motors 20 and 21 illustrated in the attached drawings are only illustrative and the positions of the fixed and movable members may be disposed on suitable portions of the base 1, table body 3 and the intermediate carriage 4.

The linear motor-driven table apparatus of the invention, which has been described hereinbefore through specific embodiments, offers the following advantages.

According to the invention, the table body is moved relatively to the intermediate carriage which in turn is moved with respect to the base, through a suitable control of two linear motors, such that the difference between the travel of the intermediate carriage with respect to the base and the travel of the table body with respect to the intermedicate carriage or, alternatively, the sum of these travels appear as the amount of feed of the table body with respect to the base. It is, therefore, possible to effect a highly precise fine feed of the table body with respect to the base and also to effect a large feed with high precision of positioning.

It is to be noted also that the use of linear motors eliminates the necessity of the ball screw and nut assembly and the spline assembly, so that the weight and hence the inertia of the movable part such as the table body is reduced such as to enhance the starting and stopping characteristics, thus attaining a remarkable improvement in the precision of positioning of the table body.

The use of the linear motors also eliminates any error which otherwise may be caused by twisting of the screw shaft of the ball screw and nut assembly and the spline shaft of the ball spline, as well as by backlash which inevitably exists between the screw shaft and the nut and between the spline shaft and the outer sleeve when the above-mentioned assemblies are used.

In addition, the thickness of the whole apparatus is reduced and the construction is made compact such as to widen the application of the table apparatus, by virture of the elimination of the rotary motor, screw shaft and nut assembly and the apline assembly. For the same reason, the number of parts is decreased to reduce the production cost while assuring higher precision of assemblage, and the risk of occurrence of trouble is minimized thanks to the simplified construction.

Furthermore, the amounts of feed in the fine-feed mode and the large-feed mode can be varied as desired by suitably selecting the diffrence between the pitch of the teeth on the fixed member of the linear motor disposed between the base and the intermediate carriage and the pitch of the teeth of the linear motor and the number of teeth on the fixed member of the linear motor disposed between the intermediate carriage and the table body.

Although the invention has been described through specific terms, it will be clear to those skilled in the art that the described embodiments are only illustrative and various changes and modifications may be imparted thereto without departing from the scope of the invention which is limited solely by the appended claims.

What is claimed is:

1. A linear motor-driven table apparatus capable of operating both in fine-feed and large-feed mode comprising:
   a base;
   a table body;
   an intermediate carriage disposed between said base and said table body;
   first and second linear bearing means located between said base, said table body and said intermediate carriage, respectively, so as to be movable in a longitudinal direction of said base with respect to said base and with each other, each of said first and second linear bearing means comprising a bearing block provided with a ball-rolling groove at one end thereof and an internal ball-recirculating hole, a retainer which retains a loaded ball train, and a pair of end plates each providing communication between said ball-rolling groove and said ball-recirculating hole so as to allow balls to roll and recirculate along endless passages formed by said ball-rolling groove and said ball-recirculating hole, the angle of contact between the ball-rolling groove and the loaded balls being set at substantially 45 degrees;
   an adjusting means for setting the clearance between the first and second linear bearing means and said base, said table body and said intermediate carriage;
   a first linear motor means acting between said base and said intermediate carriage comprising a first fixed member secured to either one of an upper side surface of said base or an underside surface of said intermediate carriage and a first movable member secured to the other one of the upper side surface or the underside surface so as to oppose said fixed member; and
   a second linear motor means acting between said intermediate carriage and said table body comprising a second fixed member secured to either one of an upper side surface of said intermediate carriage or an underside surface of said table body and a second movable member secured to the other one of the upper side surface or the other side surface so as to oppose said second fixed member.

2. The linear motor-driven table apparatus according to claim 1, wherein said first linear bearing means include a pair of bearing bodies mounted on the bilateral end surfaces of the intermediate carriage to be movable therealong in the longitudinal direction of the base, and said second linear bearing means include a pair of guide tracks integrally formed on said base at the bilateral end portions thereof and a pair of bearing bodies mounted on the bilateral sides of said table body so as to be engaged with said guide tracks respectively to be movable therealong in the longitudinal direction of said base.

3. The linear motor-driven table apparatus according to claim 2 wherein the engagement between said bearing bodies and said intermediate carriage is made to be movable through rows of balls rolling through passages defined by ball rolling grooves formed on the opposed surfaces of said bearing bodies and said intermediate carriage, the angle of contact between said balls and each of said ball-rolling grooves being set at substantially 45 degrees, and wherein the engagement between said bearing bodies and said guide tracks is made to be movable through rows of balls rolling through passages defined by ball-rolling grooves formed on the opposed surfaces of said bearing body and said guide tracks, the angle of contact between said balls and each of said ball-rolling grooves being set at substantially 45 degrees.

4. The linear motor-driven table apparatus according to claim 1 wherein said first linear bearing means include a pair of guide tracks mounted on the bilateral sides of the table body and a pair of bearing bodies mounted on the base so as to be engaged with said guide tracks respectively to be movable therealong in the longitudinal direction of said base, and said second linear bearing means include a pair of bearing bodies mounted on the base so as to be located on bilateral sides of the intermediate carriage to be engaged with the bilateral side surfaces of said intermediate carraige to be movable therealong in the longitudinal direction of said base.

5. The linear motor-driven table apparatus according to claim 4 wherein the engagement between said bearing bodies and said guide tracks is made to be movable through rows of balls rolling through passages defined by ball-rolling grooves formed on the opposed surfaces of said bearing bodies and said guide tracks, the angle of contact between said balls and each of said ball-rolling grooves being set at substantially 45 degrees, and wherein the engagement between said bearing bodies and said intermediate carriage is made to be movable through rows of balls rolling througn passages defined by ball-rolling grooves formed on the opposed surfaces of said bearing bodies and said intermediate carriage, the angle of contact between said balls and each of said ball-rolling grooves being set at substantially 45 degrees.

6. The linear motor-driven table apparatus according to claim 1 wherein said first linear bearing means include a pair of guide tracks mounted on bilateral both sides of the table body and a pair of bearing bodies mounted on the intermediate carriage at the bilateral sides of said table body so as to be engaged with said guide tracks respectively to be movable therealong in the longitudinal direction of said base, and said second linear bearing means include a pair of guide tracks mounted on bilateral sides of the base and a pair of bearing bodies mounted on the intermediate carriage at the bilateral sides of the base so as to be engaged with the latter mentioned guide tracks respectively to be movable therealong in the longitudinal direction of said base.

7. The linear motor-driven table apparatus according to claim 6 wherein the engagement between said guide tracks and said bearing bodies is made to be movable through rows of balls rolling though passages defined by ball-rolling grooves formed on the opposed surfaces of said guide tracks and said bearing bodies, respectively, the angle of contact between said balls and each of said ball-rolling grooves being set at substantially 45 degrees, and wherein the engagement between said guide tracks located on the sides of said base and said bearing bodies is made to be movable through rows of balls rolling through passages defined by ball-rolling grooves formed on the opposed surfaces of said guide track and said bearing bodies, respectively, the angle of contact between said balls and each of said ball-rolling grooves being set at substantially 45 degrees.

8. A linear motor-driven table apparatus cable of operating both in fine-feed and large-feed mode comprising:
   a base;
   a table body;
   an intermediate carriage disposed between said base and said table body;
   first and second linear bearing means located between said base, said table body and said intermediate carraige, respectively, so as to be movable in a longitudinal direction of said base with respect to said base and with each other, each of said first and second linear bearing means comprising a bearing block provided with a roller-rolling groove at one end thereof, the angle of contact between the roller-rolling groove and the loaded rollers being set about 45 degrees;
   a first linear motor means acting between said base and said intermediate carriage comprising a first fixed member secured to either one of an upper side surface of said base or an underside surface of said intermediate carriage and a first movable member secured to the other one of the upper side surface or the underside surface so as to oppose said fixed member; and
   a second linear motor means acting between said intermediate carriage and said table body comprising a second fixed member secured to either one of an upper side surface of said intermediate carriage or an underside surface of said table body and a second movable member secured to the other one of the upper side surface or the other side surface so as to oppose said second fixed member.

9. The linear motor-driven table apparatus according to claim 8 wherein said first linear bearing means comprises a pair of guide tracks mounted on the bilateral sides of the table body and a first pair of bearing bodies mounted on the base so as to be engaged with said guide tracks respectivley to be movable therealong in the longitudinal direction of said base, and said second linear bearing means comprises a second pair of bearing bodies mounted on the base so as to be located on bilateral both sides of the intermediate carriage to be engaged with guide tracks on the bilateral side surfaces of said intermediate carriage to be movable therealong in the longitudinal direction of said base.

10. The linear motor-driven table apparatus according to claim 9 wherein the engagement between said first pair of bearing bodies and said guide tracks on the table body is made to be movable through rows of rollers rolling through passages defined by roller-rolling grooves formed on the opposed surfaces of said first pair of bearing bodies and said guide tracks, the angle of contact between said rollers and each of said roller-rolling grooves being set at about 45 degrees, and wherein the engagement between said second pair of bearing bodies and said guide tracks on the intermediate carriage is made to be movable through rows of rollers rolling through passages defined by roller-rolling grooves on the opposed surfaces of said second pair of bearing bodies and said guide tracks on the intermediate carriage, the angle of contact between said rollers and each of said roller-rolling grooves being set at about 45 degrees.

11. The linear motor-driven table apparatus of claim 1, wherein the adjusting means comprises a plurality of bolts threaded laterally through the table body such that the end of each bolt contacts linear bearing means pressing the linear bearing means against the intermediate carriage causing the clearance between the bearing means to be increased or decreased according to the tightening of the screw, and such adjusting means further causing a similar change in the clearance between the opposite surface of the intermediate carriage and the adjacent linear bearing means due to the reactional force of the bolts being transmitted through the table body.

* * * * *